US008568088B2

(12) United States Patent
Richter

(10) Patent No.: US 8,568,088 B2
(45) Date of Patent: Oct. 29, 2013

(54) MAGNETIC DEVICE FOR DAMPING BLADE VIBRATIONS IN TURBOMACHINES

(75) Inventor: Christoph Hermann Richter, Ibbenbüren (DE)

(73) Assignee: Siemens Aktiengesellschaft, München (DE)

( * ) Notice: Subject to any disclaimer, the term of this patent is extended or adjusted under 35 U.S.C. 154(b) by 658 days.

(21) Appl. No.: 12/809,205

(22) PCT Filed: Nov. 25, 2008

(86) PCT No.: PCT/EP2008/066156
§ 371 (c)(1), (2), (4) Date: Jun. 18, 2010

(87) PCT Pub. No.: WO2009/080433
PCT Pub. Date: Jul. 2, 2009

(65) Prior Publication Data

US 2010/0278636 A1 Nov. 4, 2010

(30) Foreign Application Priority Data

Dec. 21, 2007 (EP) .................................... 07024982

(51) Int. Cl.
*F03D 11/00* (2006.01)

(52) U.S. Cl.
USPC .......................................... 415/119; 416/500

(58) Field of Classification Search
USPC ........ 415/119, 173.1, 173.6; 416/174, 146 R, 416/500
See application file for complete search history.

(56) References Cited

U.S. PATENT DOCUMENTS

| | | | | | |
|---|---|---|---|---|---|
| 4,722,668 | A | * | 2/1988 | Novacek | 416/190 |
| 5,365,663 | A | | 11/1994 | Demartini | |
| 5,490,759 | A | * | 2/1996 | Hoffman | 415/10 |
| 5,709,527 | A | * | 1/1998 | Ernst et al. | 415/10 |
| 5,967,749 | A | * | 10/1999 | Eaves et al. | 416/3 |

FOREIGN PATENT DOCUMENTS

| | | | |
|---|---|---|---|
| CN | 1973118 | A | 5/2007 |
| DE | 426057 | C | 3/1926 |
| DE | 19937146 | A1 | 2/2001 |
| EP | 0727564 | B1 | 11/1998 |
| EP | 0928738 | A2 | 7/1999 |
| EP | 1596037 | A2 | 11/2005 |
| GB | 2409936 | A | 7/2005 |
| GB | 2438185 | A | 11/2007 |

* cited by examiner

*Primary Examiner* — Edward Look
*Assistant Examiner* — Christopher J Hargitt

(57) ABSTRACT

An arrangement for damping blade vibrations in a turbomachine is provided. The blade vibrations are due to an arrangement made of magnets and multiple induction plates and the undesired vibrations of the blade are damped by creating turbulent flows, wherein the induction plates are directed parallel to the rotation axis, and the magnetic field caused by the magnets is formed homogenously in the circumferential direction.

14 Claims, 4 Drawing Sheets

MAGNETIC DEVICE FOR DAMPING BLADE VIBRATIONS IN TURBOMACHINES

CROSS REFERENCE TO RELATED APPLICATIONS

This application is the US National Stage of International Application No. PCT/EP2008/066156, filed Nov. 25, 2008 and claims the benefit thereof. The International Application claims the benefits of European Patent Office application No. 07024982.6 EP filed Dec. 21, 2007. All of the applications are incorporated by reference herein in their entirety.

FIELD OF INVENTION

The invention refers to a turbomachine, especially to a steam turbine, comprising a turbine blade which is rotatably arranged around a rotational axis and oriented along a blade axis, a housing which is arranged around the turbine blade, an induction plate which is arranged in the turbine blade tip, and a magnet which is arranged in the housing.

BACKGROUND OF INVENTION

Water turbines, steam and gas turbines, windmills, centrifugal pumps and centrifugal compressors, and also propellers, are classified under the collective term turbomachines. Common to all these machines is the fact that they serve the purpose of extracting energy from a fluid in order to drive another machine as a result, or, vice versa, to supply energy to a fluid in order to increase its pressure.

In a turbomachine, the energy conversion is carried out indirectly and takes the path via the kinetic energy of the flow medium. In a turbine, for example, the flow medium flows through fixed stator blades, wherein the velocity and therefore the kinetic energy of the flow medium are increased at the expense of its pressure. As a result of the shape of the stator blades, a velocity component is created in the circumferential direction of the rotor wheel. The fluid or flow medium yields its kinetic energy to the rotor by the velocity value and the direction being altered during exposure of the passages, which are formed by the rotor blades, to throughflow. The rotor wheel is driven by means of the forces which are created in the process.

The rotating blades in a turbomachine are designed in a resonance-free manner for the widest possible range of operating volume changes, the blades may be subjected to excitation of vibrations which could lead to a failure of the blades if vibration resonances lead to excessively high mechanical stresses. Various devices have been developed in order to damp these vibrations. For example, it is known to couple blades to each other in order to damp vibrations as a result.

In DE 199 37 146 A1, a turbomachine is presented, in which permanent magnets are incorporated in the blade tip in order to couple adjacent turbine blades by means of magnetic forces.

EP 0 727 564 B1 discloses a turbomachine with turbine blades and a housing which is arranged around the turbine blade, wherein magnets consisting of rings are arranged in the housing on the circumference of the inner surface of the housing. The turbine blades have a conductive material on the tips, as a result of which vibrations can be reduced during a movement of these turbine blades towards the magnets.

In EP 1 596 037, a turbine blade arrangement is also disclosed, with which vibrations are to be reduced.

Vibrations of the blades are undesirable since they can lead to material fatigue of the blade and of the rotor steeple. Each per mil point of improved logarithmic damping decrement is desirable. Shrouded blades have for example an overall damping of 0.5% logarithmic decrement. A doubling of this value leads all round to a halving of the resonance amplitudes, which can mean that one mode less is to be determined. Also, the permissible speed range can be broadened as a result.

The available measures for damping vibrations have the disadvantage that they require a comparatively conditions. If the operating conditions change, for example as a result of large amount of installation space. This installation space, however, as a rule is not available. The high centrifugal forces which occur in turbomachines are a further limiting factor.

The vibration damping methods, which are induced by magnetic forces, such as in EP 0 727 564 B1, DE 199 37 146 A1 and EP 1 596 037 A2, have the disadvantage that the forces which are created as a result of eddy currents do not differentiate between a movement of the turbine blade tip in the principal movement and a disturbing vibrational movement. In other words, a movement of the blade in the rotational direction, i.e. in the circumferential direction, is influenced by the magnetic forces which give rise to eddy currents, which is undesirable. A vibrational movement which is not executed in the circumferential direction, for example in the axial direction, is to be damped by means of magnetic forces which give rise to eddy currents.

It would be desirable to have a device which damps vibrations of a blade, wherein the device does not have any influence upon the movement of the blade in the principal direction, i.e. in the circumferential direction.

SUMMARY OF INVENTION

The invention starts at this point, the object of which invention is to disclose a turbomachine which enables an effective damping of blade vibrations.

This object is achieved by means of a turbomachine, especially a steam turbine, comprising a turbine blade which is rotatably arranged around a rotational axis and oriented along a blade axis, a housing which is arranged around the turbine blade, an induction plate which is arranged in the turbine blade tip, and a magnet which is arranged in the housing, wherein the induction plate is oriented in a plane which is formed by the rotational axis and a radial direction.

It is an essential feature of the invention that so-called induction plates are arranged in the blade tip. Such induction plates are produced from a suitable material, this material being electrically conductive and therefore suitable for creating eddy currents. These induction plates are oriented along a plane which is formed by the rotational axis and a radial direction. This plane is naturally not stationary, i.e. this plane rotates around the rotational axis. The induction plate is optimized for damping, i.e. is oriented parallel to the rotational axis and parallel to the radial direction. Since the radial direction is temporally unaltered during operation, i.e. rotates around the rotational axis at the rotation frequency, the induction plate is always oriented perpendicularly to the housing opposite. A magnet, which is arranged in the housing, is oriented in such a way that the magnetic field acts in the direction of the induction plates. A movement of the induction plate as a result of this magnetic field induces eddy currents in the induction plate which results in development of an opposing magnetic field, which, according to Lenz's law, is formed in opposition to the external magnetic field, which gives rise to an opposing force which leads ultimately to damping.

Further advantageous developments are disclosed in the dependent claims.

It is therefore advantageous for the magnetic north pole and the magnetic south pole of the magnet to lie on a circular path, wherein the circular path is oriented rotationally symmetrically around the rotational axis. Since turbomachines as a rule have a high degree of symmetry, it is necessary for the adjacent magnetic field to be oriented virtually on the existing symmetry. A magnetic field which is not oriented along the circular path would lead to undesirable side effects. For example, a desirable blade movement could be braked.

The magnetic field can be created by means of a permanent magnet or created electrically. The electrically created magnetic field can advantageously be achieved by means of an axially symmetrical coil with a field which is arranged orthogonally to the plates.

The circular path advantageously extends along an inner circumferential surface of the housing. As a result of this measure, the magnetic field is formed in a further homogenized or symmetrical manner. This symmetrically formed magnetic field results in a targeted damping of undesirable blade vibrations.

The magnet in this case is advantageously of a horseshoe-shaped or U-shaped design. The magnetic field of a magnet is greatly dependent upon its geometric shape. Thus, the magnetic field of a bar magnet differs from the magnetic field of a horseshoe-shaped magnet. The magnetic field of a bar magnet is inhomogeneous in comparison to the horseshoe-shaped or U-shaped magnet. An arrangement of the horseshoe-shaped or U-shaped magnet on the housing, the sides of the housing being arranged on a circular path, results in a relatively homogenous field, as a result of which the induction plate is moved.

In a further advantageous development, a plurality of magnets are used, wherein the magnets are arranged in series, as seen in the circumferential direction, forming a first circular magnet row. An eddy current is created only when the movement of the induction plate is perpendicular to an external magnetic field. A movement of the induction plate parallel to an external magnetic field does not give rise to eddy currents and therefore does not lead to damping of the blade vibration. An individual magnet naturally has a stray field of greater or lesser magnitude, which in addition to parallel components also has components which are perpendicular to the movement direction of the induction plate. This means that the induction plate, which is moving as a result of this individual magnetic field of an individual magnet, temporarily passes through a parallel portion of the magnetic field. If, as proposed in this advantageous development, a plurality of magnets are arranged in series in the circumferential direction, then the individual magnetic fields, which are induced by means of the individual magnets, are arranged to form a common magnetic field which is formed in the circumferential direction. This common magnetic field results in an almost homogenous field in the circumferential direction, wherein the magnetic lines of force are oriented almost in a circular manner along the circumference. A movement of the induction plate in the circumferential direction is therefore oriented parallel to the magnetic field, as a result of which no eddy currents are created. A movement of the induction plate in this direction therefore does not result in disturbing forces which are induced by means of the magnetic field. From now on, only those movements are slowed down which have a component which is oriented transversely to the magnetic lines of force. Such movements for example are vibrations in the axial direction. Since this mode of vibration has a component which is perpendicular to the magnetic field, this vibration is braked by means of the external magnetic field.

In a further advantageous development, a number of n magnets are provided in the circumferential direction, wherein n represents a positive whole number, wherein the magnets are arranged in series with a regular spacing of u/n, wherein u represents the circumference of the inner circumferential surface. This leads to the number of magnets being adapted to the circumference. It is advantageous if the magnets are arranged with equidistant spacing in relation to each other on the circumference. As a result, the homogeneity or symmetry of the magnetic field is increased. A non-equidistant arrangement of the magnets would lead to inhomogeneities in the magnetic field, which gives rise to disturbing eddy currents in the induction plates which occur during movement of the induction plates in the principal direction.

In a further advantageous development, provision is made for a second circular magnet row, comprising a plurality of magnets which are arranged in the circumferential direction, wherein the second circular magnet row is arranged in front of the first circular magnet row in the axial direction. Provision is advantageously made for n magnets in the second circular magnet row, wherein the magnets are arranged in series with a regular spacing of u/n. This is a further measure in order to homogenize the magnetic field in the inner housing virtually along the blade tip. As a result, movements in the principal direction are not influenced, whereas movements which are induced as a result of disturbing vibrations are damped.

In a further advantageous development, the magnets of the second circular magnet row are arranged in an offset manner in relation to the magnets of the first circular magnet row. This leads to homogenization of the magnetic field along the circumferential direction in the housing of the turbomachine. A movement of the induction plate in the principal direction is not influenced as a result, whereas movements of the induction plate transversely to the principal direction are damped.

The invention has inter alia the advantage that no rubbing parts are necessary in order to damp vibrations. With the known methods, in most cases a connection is created between the individual blades, which inevitably leads to rubbing in the connecting pieces, which results in wear.

A further advantage of the invention is that it can be used with titanium blades. Furthermore, the device according to the invention is very effective, wherein high damping values can be achieved.

BRIEF DESCRIPTION OF THE DRAWINGS

The invention is explained in more detail based on an exemplary embodiment. In this case, components with the same designations have the same action.

In the drawing.

DETAILED DESCRIPTION OF INVENTION

Figure 1:
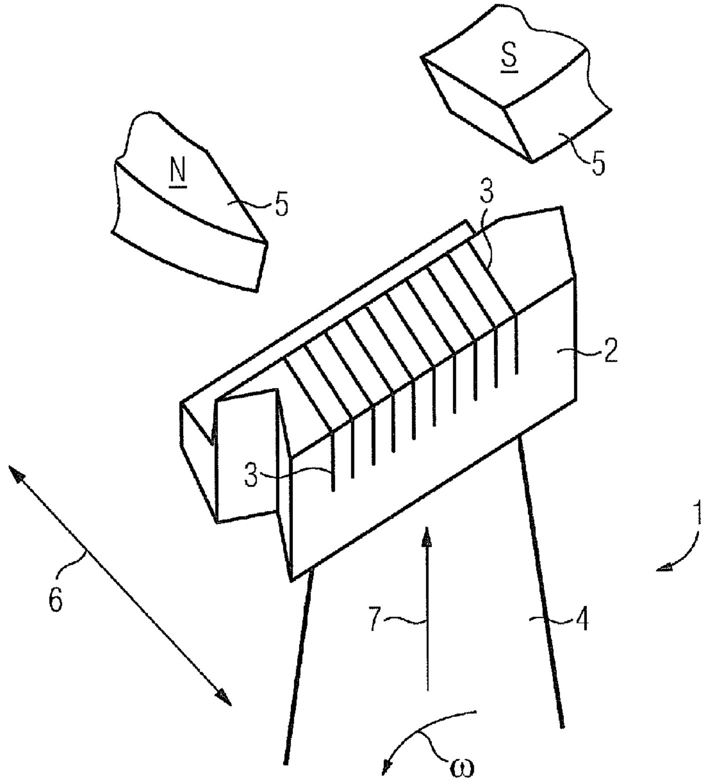
FIG. 1 shows a perspective view of a blade tip with arrangement of a magnet.

FIG. 1 shows a blade 1. This blade 1 can be a turbine blade or a compressor blade. The blade 1 is arranged on a rotor, which is not shown. The arrangement consisting of rotor and blade 1 is rotatably mounted around a rotational axis 23 which is not shown in FIG. 1. During operation, a rotation around this rotational axis 23 is executed at a rotational frequency ω. The principal movement of the blade 1 extends along the rotor orbit. An undesirable movement which is superimposed upon these principal movements is the vibration of the blade 1. These disturbing vibrations can be damped by means of eddy currents. The arrangement of the induction plates 3 and of the magnetic field result in no force components, which brake the principal movement, being created since these brake the motor.

The blade 1 has a shroud 2 in which induction plates 3 are arranged. The shroud 2 is arranged on a blade airfoil 4. The rotor, with the blades 1, is rotatably mounted in a turbomachine, which is not shown. A housing is arranged around the rotor and the blades 1. The housing has a magnet 5. In FIG. 1, for reasons of clarity, only the magnetic north pole N and the magnetic south pole S are diagramatically shown. The blade 1 executes a disturbing vibration in the axial direction 6. The induction plate 3 in this case is oriented in a plane which is fainted by the rotational axis 23 and a radial direction. This radial direction can be represented in FIG. 1 by means of a blade axis 7. During operation, this blade axis 7 rotates around the rotational axis 23 at the rotational frequency ω.

Figure 2:
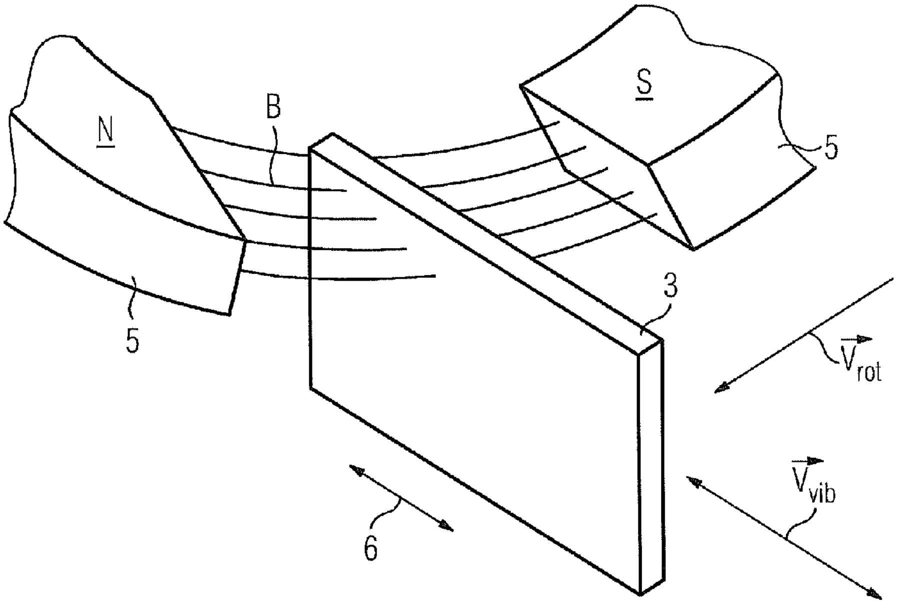
FIG. 2 shows an enlarged view of an induction plate with magnetic field.

FIG. 2 shows an individual induction plate 3 and its arrangement in relation to the magnetic field B of the magnet 5. For reasons of clarity, only the magnetic north pole N and the magnetic south pole S of the magnet 5 are shown in FIG. 2.

The induction plate 3 executes a desired movement $V_{rot}$ in the circumferential direction 17 and a disturbing movement $V_{vib}$ in the axial direction 6. As a result of the movement of the induction plate 3 in the axial direction 6 a Lorenz force acts proportionally to the speed since the magnetic field B is perpendicular to the induction plate 3. This Lorenz force gives rise to an eddy current which acts against the movement of the induction plate 3, as a result of which the vibration of the induction plate 3 is braked.

The principal movement, however, does not give rise to significant eddy currents since the induction plate 3 is movable in the direction of movement and therefore offers no resistance to the current flow. As a result, no significant Lorenz force, which could brake the principal movement, is established.

Figure 3:
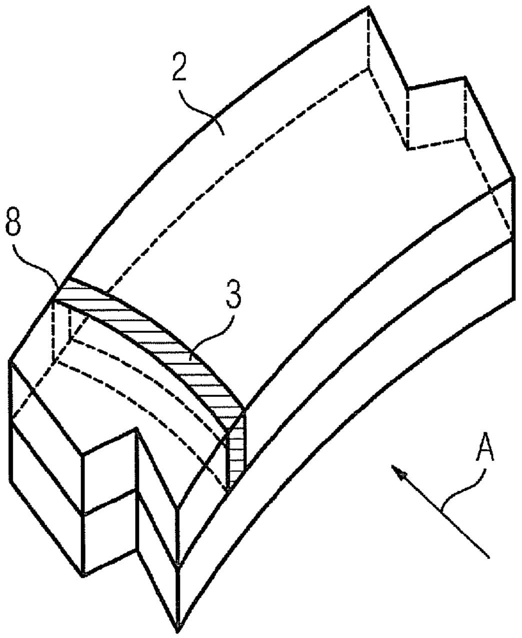
FIG. 3 shows a perspective view of a shroud with an induction plate.

In FIG. 3, a view of the shroud 2 with an individual induction plate 3 is shown. The shroud 2 has recesses which are formed in order to couple adjacent shrouds 2, in a manner of speaking. The induction plates 3 in this case are formed from an electrically conductive material and are incorporated in the shroud 2. The shroud 2 and an upper edge 8 of the induction plate 3 are planar with a surface 9 of the shroud, which is to be seen in FIG. 4, which shows a side view in the direction A from FIG. 3.

The induction plates 3 are advantageously electrically insulated from each other.

Figure 4:
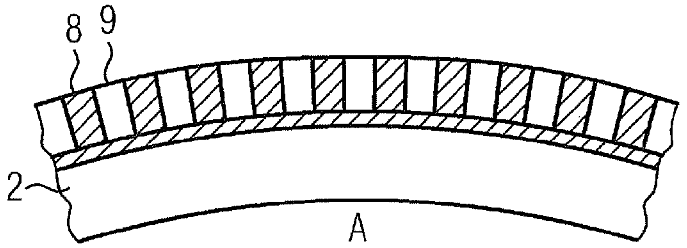
FIG. 4 shows a side view of the shroud from FIG. 3 with a plurality of induction plates.

In FIG. 4, a plurality of induction plates 3 are shown. Increasing the number of induction plates 3 leads to an enhancement of the effect of the eddy current development.

Figure 5:
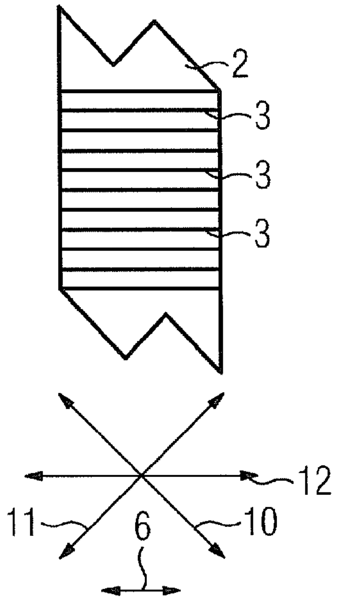
FIG. 5 shows a plan view from above of the shroud with induction plates.

FIG. 5 shows a plan view of the shroud 2 as seen in the radial direction of the blade axis 7. The blade axis 7 is therefore perpendicular to the plane of the figure. The arrows 10, 11, 12 represent possible undesirable vibration directions 10, 11, 12. All these vibration directions 10, 11, 12 have a component which points in the axial direction 6. The vibrations which occur in this axial direction 6 are braked as a result of eddy current effects.

Optimizations with regard to the orienting of the induction plates 3 can be undertaken in such a way that specific modes are damped as a priority. Combinations of arrangements upon one blade or upon different blades 1 combined are also conceivable.

Figure 8:
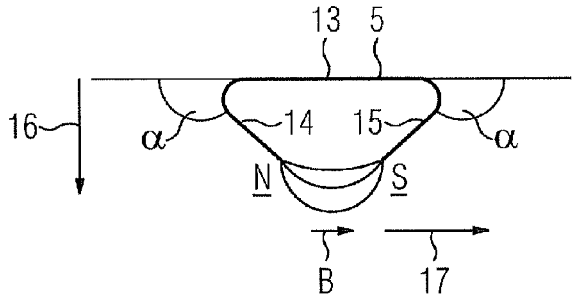
FIG. 8 shows a schematic view of a magnet.

The magnet 5, as shown in FIG. 8, is of a horseshoe-shaped or U-shaped design. For this, the magnet 5 has a long edge 13 and two short edges 14 and 15. The short edge 14 is curved by about an angle α of 120° in relation to the long edge 13. Similarly, the short edge 15 is curved by the angle α of about 120° in relation to the long edge 13. The angle α can have a value range of between 90° and 160° in alternative exemplary embodiments of the magnet 5. The short edge 14 is formed as the magnetic north pole and the short edge 15 is formed as the magnetic south pole. Between the magnetic north pole N and the magnetic south pole S a magnetic field B is formed, which for physical reasons has a homogenous distribution on the shortest distance between the magnetic north pole and the magnetic south pole S. In a radial direction 16, the magnetic field B becomes inhomogeneous. The inhomogeneity of the magnetic field B in the radial direction, and therefore also in a circumferential direction 17, is consequently remedied by a plurality of magnets 5 being arranged on the housing in the circumferential direction 17. The magnetic field B becomes more homogenous in the circumferential direction 17 as a result.

Figure 9:
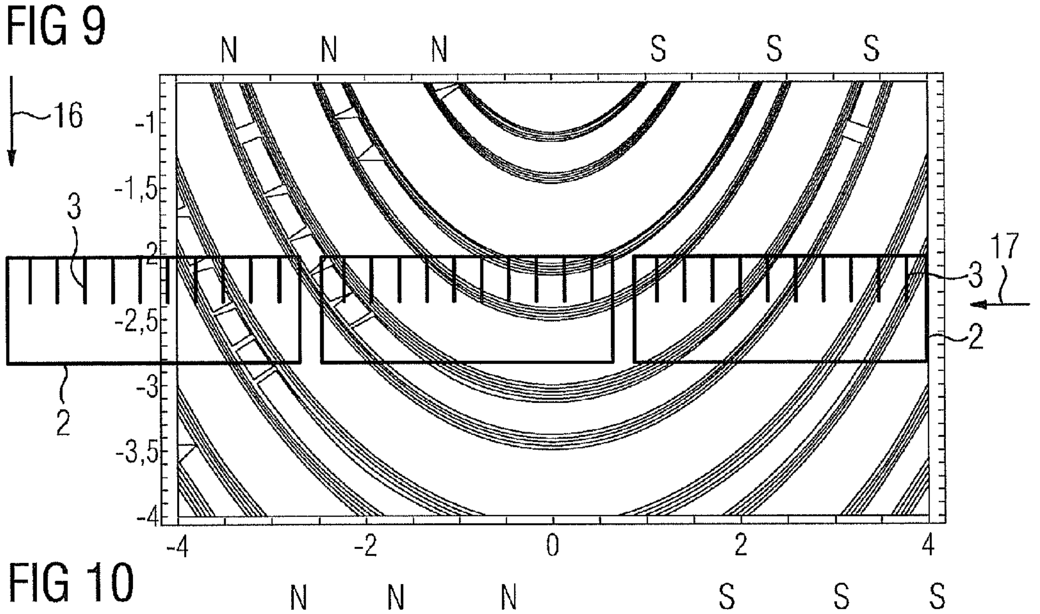
FIG. 9 shows a view of the magnetic field of a magnet.

Shown in FIG. 9 is the magnetic field B of a magnet 5, which is not shown. FIG. 9 shows the magnetic field B in the region of the shroud 2, as seen in the axial direction 6. It is clearly to be seen that the magnetic line of force from the magnetic north pole to the magnetic south pole assumes a circular path-like fowl. The shrouds 2 are moved in the circumferential direction 17 as a result of this magnetic field B. In the black-and-white representation of the magnetic field which is selected in FIG. 9, a strong magnetic field is symbolized by white and a weak magnetic field is symbolized by black or by shading.

Figure 10:
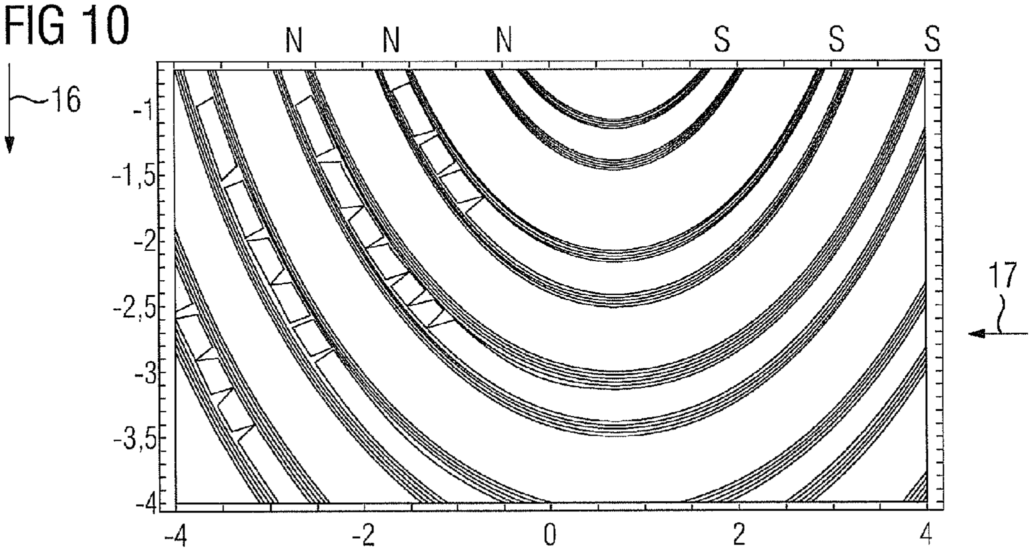
FIG. 10 shows a view of a magnetic field, arranged in an offset manner, through a magnet.

In FIG. 10, the magnetic field B of a magnet 5 which is offset in the circumferential direction 17 is shown. The same applies to the view of the magnetic field B in FIG. 10 as applies to FIG. 9. The magnetic lines of force are formed in a circle-like manner in this case also.

Figure 11:
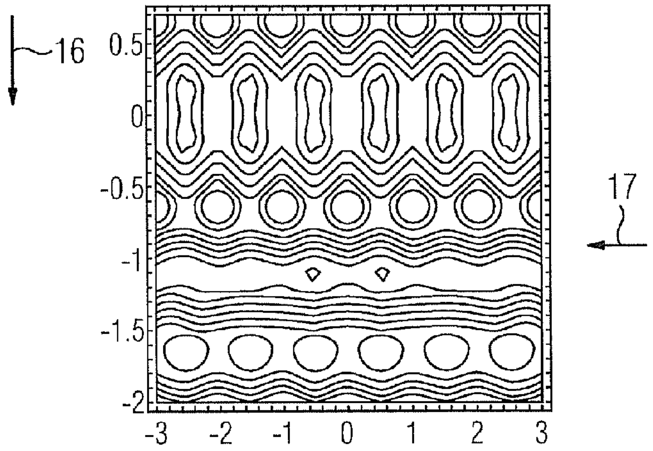
FIG. 11 shows a view of the magnetic field which is created by a plurality of magnets which are arranged in an offset manner in relation to each other and distributed in the circumferential direction.

In FIG. 11, a magnetic field B is finally to be seen, which is to be seen through a superimposition of a plurality of magnetic fields of the individual magnets 5. It is clearly to be seen that at a specific level in particular, which for example is identified by −1, the magnetic field in the circumferential direction 17, which is represented by the X-axis, is beyond doubt homogenous. An induction plate which is moved in this X-direction accordingly experiences no disturbing magnetic deflection force in the form of the Lorenz force because the magnetic fields and the direction of movement are parallel to each other.

The Y-axis in FIGS. 9, 10 and 11 reproduces a spatial arrangement. For example, the upper edge of FIGS. 9, 10 and 11 could symbolize the housing. The Y-axis points in the direction of the blade axis 7 which points in the radial direction 16.

The magnets 5 are faulted as permanent magnets or as electrically controlled magnets.

The magnets 5 are arranged in series, as seen in the circumferential direction 17, which results in a first circular magnet row 18. In this case, a number of n magnets 5 are provided in the circumferential direction 17, wherein n represents a positive whole number. The magnets 5 are arranged in series with a regular spacing of u/n, wherein u represents the circumference of the inner circumferential surface. A second circular magnet row 19, comprising a plurality of magnets 5, is arranged behind the first circular magnet row 18, as seen in the axial direction 6. The second circular magnet row 19 comprises a plurality of magnets 5 which are arranged in series in the circumferential direction 17. The second circular magnet row 19 has magnets 5 which are arranged in series with a regular spacing of u/n. Furthermore, a third additional circular magnet row 20 can be arranged behind the second circular magnet row 19 in the axial direction 6. This third circular magnet row 20 also comprises a plurality of magnets 5 which are arranged in series with a regular spacing of u/n.

So that the magnetic field is formed as homogenously as possible, the second circular magnet row 19 is arranged in an offset manner to the first circular magnet row 18. The third circular magnet row 20 is in turn offset to the second circular magnet row 19. The offset of the third circular magnet row 20 in relation to the second circular magnet row 19, and the offset of the second circular magnet row 19 in relation to the first circular magnet row 18, should be equidistant. The offset 21 can be a complete long edge 13. The offset 21 can be half the length of the long edge 13. Similarly, in an alternative embodiment the offset can be a quarter of the long edge 13. There is a space 22 between the individual magnets 5. The space 22 results inevitably from the size of the magnet 5, especially the long edge 13, and the number n of magnets 5 and the circumference u since the magnets 5 are arranged with equidistant spacings 22 in relation to each other in a circular magnet row 18, 19, 20.

Figure 6:
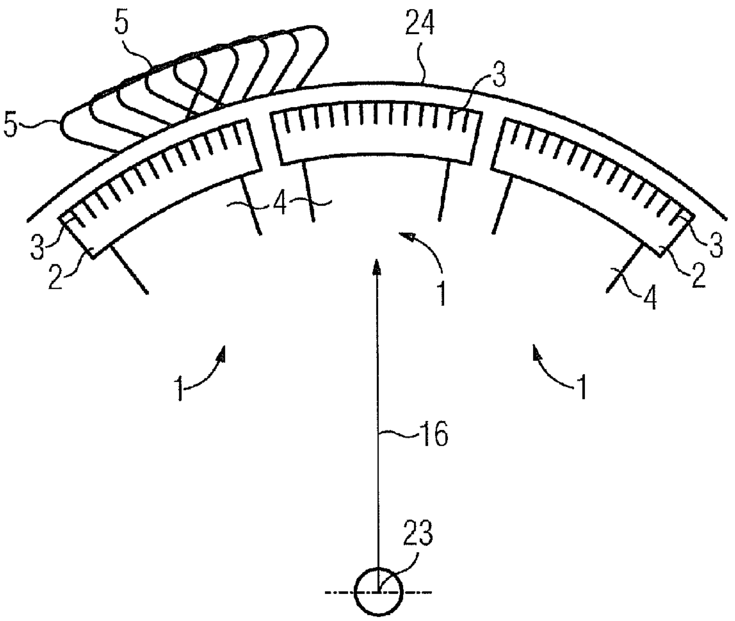
FIG. 6 shows a side view of a plurality of blades.
Figure 7:
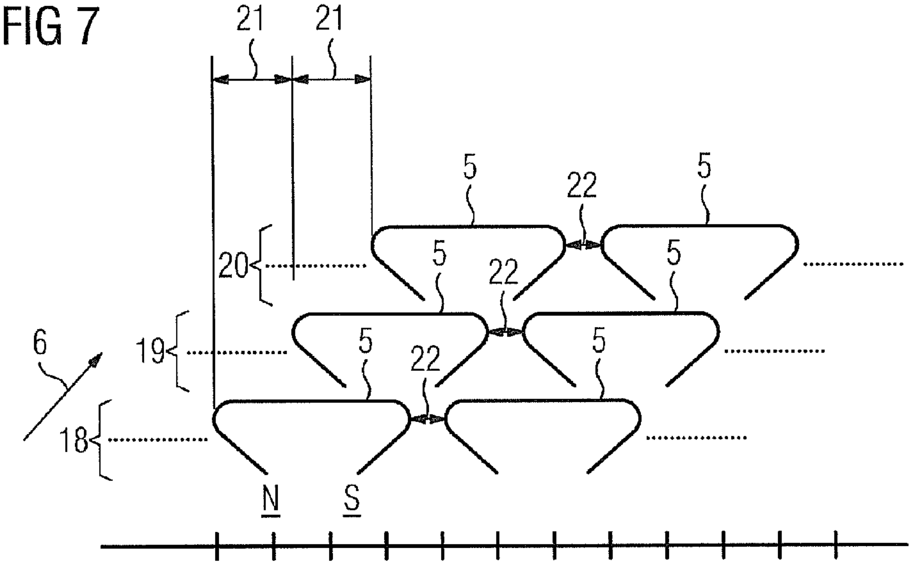
FIG. 7 shows a schematic view of the arrangement of the magnets.

In FIG. 6, a view of the blade 1 and the magnets 5 in the axial direction 6 is to be seen. The axial direction 6 is perpendicular to the plane of the figure. The blades 1 rotate around the rotational axis 23. The arrangement of the magnets 5 corresponds to the arrangement according to FIG. 7. The arrangement of the magnets in FIG. 6 is shown only symbolically. The magnets 5 are arranged around the entire inner surface of the housing. Naturally, the magnetic north pole N and the magnetic south pole S of the individual magnets 5 are on a circular path 24, wherein the circular path 24 is oriented rotationally symmetrically around the rotational axis 23. The circular path 24 extends along an inner circumferential surface of the housing.

The invention claimed is:

1. A turbomachine, comprising:

a blade which is rotatably arranged around a rotational axis and oriented along a blade axis;

a housing which is arranged around the blade;

a plurality of induction plates which are arranged in a blade tip; and a magnet which is arranged in the housing, wherein the plurality of induction plates are oriented in a plane which is formed by the rotational axis and a radial direction, wherein a magnetic north pole and a magnetic south pole of the magnet lie on a circular path, and form a magnetic field with magnetic lines of force, wherein the blade tip is moved through the magnetic field, wherein the circular path is oriented rotationally symmetrically around the rotational axis, wherein the plurality of induction plates is oriented parallel to the rotational axis and parallel to the radial direction, wherein the plurality of induction plates is oriented perpendicularly to the magnetic field, wherein the plurality of induction plates is electrically conductive and creates eddy currents when moved through the magnetic field, and wherein the plurality of induction plates are electrically insulated from each other.

2. The turbomachine as claimed in claim 1, wherein the circular path extends along an inner circumferential surface of the housing.

3. The turbomachine as claimed in claim 1, wherein the magnet is of horseshoe-shaped design.

4. The turbomachine as claimed in claim 1, wherein the magnet is of U-shaped design.

5. The turbomachine as claimed in claim 1, wherein a first plurality of magnets are arranged in series, as seen in a circumferential direction, forming a first circular magnet row.

6. The turbomachine as claimed in claim 5, wherein a first number of n magnets are provided in the circumferential direction, wherein n represents a positive whole number, wherein the number of magnets are arranged in series with a regular spacing of u/n, and wherein u represents a circumference of the inner circumferential surface.

7. The turbomachine as claimed in claim 5, wherein provision is made for a second circular magnet row, comprising a second plurality of magnets which are arranged in the circumferential direction, and wherein the second circular magnet row is arranged in an axial direction from the first circular magnet row.

8. The turbomachine as claimed in claim 7, wherein a second number n magnets are provided in the second circular magnet row and wherein the second plurality of magnets are arranged in series with the regular spacing of u/n.

9. The turbomachine as claimed in claim 8, wherein the second plurality of magnets of the second circular magnet row are arranged in an offset manner in relation to the first plurality of magnets of the first circular magnet row.

10. The turbomachine as claimed in claim 7, wherein provision is made for a third circular magnet row, comprising a third plurality of magnets which are arranged in the circumferential direction, and wherein the third circular magnet row is arranged in an axial direction from the second circular magnet row.

11. The turbomachine as claimed in claim 10, wherein a third number n magnets are provided in a third circular magnet row and wherein the third plurality of magnets are arranged in series with the regular spacing of u/n.

12. The turbomachine as claimed in claim 11, wherein the third plurality of magnets of the third circular magnet row are arranged in an offset manner in relation to the second plurality of magnets of the second circular magnet row.

13. The turbomachine as claimed in claim 10, wherein a first offset of the third circular magnet row in relation to the second circular magnet row and a second offset of the second circular magnet row in relation to the first circular magnet row is equidistant.

14. The turbomachine as claimed in claim 1, wherein the turbomachine is a steam turbine.

* * * * *